United States Patent
Heidemeyer et al.

(10) Patent No.: US 9,132,728 B2
(45) Date of Patent: Sep. 15, 2015

(54) THERMOPLASTIC TANK

(75) Inventors: Timm Heidemeyer, Cologne (DE);
Stefan Lenz, Bergisch Gladbach (DE);
Dieter Schmitz, Bonn (DE); Volker Treudt, Windeck (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 184 days.

(21) Appl. No.: 13/813,279

(22) PCT Filed: Jul. 5, 2011

(86) PCT No.: PCT/EP2011/003340
§ 371 (c)(1),
(2), (4) Date: Apr. 8, 2013

(87) PCT Pub. No.: WO2012/013287
PCT Pub. Date: Feb. 2, 2012

(65) Prior Publication Data
US 2013/0206775 A1    Aug. 15, 2013

(30) Foreign Application Priority Data
Jul. 30, 2010   (DE) .......................... 10 2010 032 931

(51) Int. Cl.
*B60K 15/00* (2006.01)
*B60K 15/03* (2006.01)
(Continued)

(52) U.S. Cl.
CPC .............. *B60K 15/03* (2013.01); *B29D 22/003* (2013.01); *B60K 13/04* (2013.01);
(Continued)

(58) Field of Classification Search
CPC .................. B29C 65/565; B60K 2015/03032; B60K 15/03177; B60K 15/04; B60K 2015/03453; B60K 2015/0346; B60K 2015/03467; B60K 2015/03493

USPC .................. 220/562, 567.2, 4.14, 86.1, 86.2; 137/202, 43; 280/834; 277/630, 644, 277/637; 264/248, 249; 248/255.21, 248/346.05, 229.1

See application file for complete search history.

(56) References Cited

U.S. PATENT DOCUMENTS 2,160,598 A * 5/1939 Melrath .......................... 29/513
4,342,799 A 8/1982 Schwochert
(Continued)

FOREIGN PATENT DOCUMENTS

DE   4240629 A1   6/1994
DE   10021307 A1   11/2001
(Continued)

OTHER PUBLICATIONS

English translation of Japanese Office Action/Notification of Reasons for Refusal mailed Feb. 4, 2014, received in related Japanese Application No. 2013-520994, 4 pgs.
(Continued)

*Primary Examiner* — Mickey Yu
*Assistant Examiner* — Gideon Weinerth
(74) *Attorney, Agent, or Firm* — Grossman Tucker Perreault & Pfleger, PLLC

(57) ABSTRACT

The invention relates to a thermoplastic tank (1) with at least one insert part which is provided in the interior of the tank (1) and is inserted into the tank (1) through an opening (3) in a tank wall (2) and is sealed against a peripheral flange (4) provided in the region of the opening (3). The flange (4) is formed integrally with the tank wall (2) and is countersunk therein.

9 Claims, 4 Drawing Sheets

Figure 1:
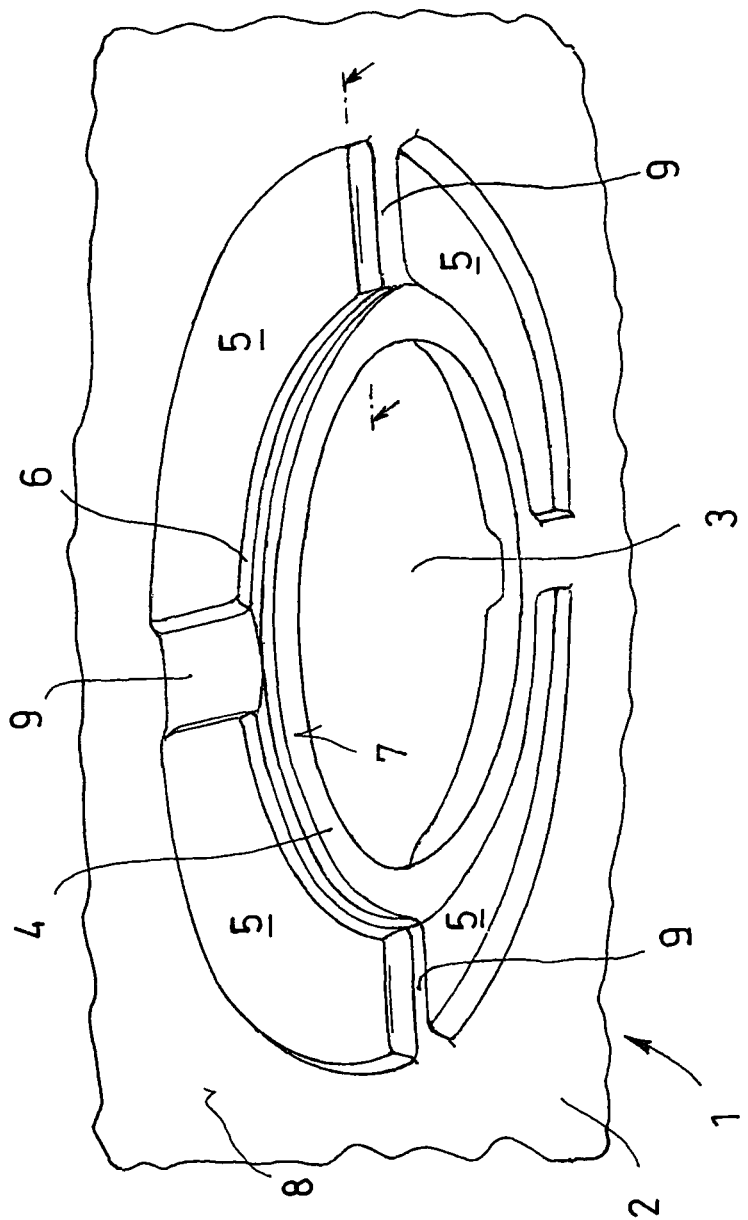

(51) Int. Cl.
  *B60K 13/04*  (2006.01)
  *B29D 22/00*  (2006.01)
  *B29C 49/04*  (2006.01)
  *B29C 65/20*  (2006.01)
  *B29C 65/78*  (2006.01)
  *B29C 65/00*  (2006.01)
  *B29K 23/00*  (2006.01)
  *B29L 31/00*  (2006.01)

(52) U.S. Cl.
  CPC ......... *B60K 15/03177* (2013.01); *B29C 49/04* (2013.01); *B29C 65/20* (2013.01); *B29C 65/7844* (2013.01); *B29C 66/131* (2013.01); *B29C 66/53461* (2013.01); *B29C 66/53462* (2013.01); *B29C 66/71* (2013.01); *B29C 66/7392* (2013.01); *B29K 2023/065* (2013.01); *B29L 2031/7172* (2013.01); *B60K 2015/03453* (2013.01)

(56) References Cited

U.S. PATENT DOCUMENTS

| | | | |
|---|---|---|---|
| 4,716,931 A * | 1/1988 | Shibamoto | 137/558 |
| 6,161,879 A * | 12/2000 | Ries et al. | 285/330 |
| 6,415,941 B1 | 7/2002 | Huse | 220/562 |
| 6,527,892 B1 * | 3/2003 | Gombert et al. | 156/156 |
| 6,698,799 B2 * | 3/2004 | Anderson et al. | 285/139.1 |
| 6,840,264 B1 | 1/2005 | Bhavsar et al. | |
| 6,860,398 B2 * | 3/2005 | Potter et al. | 220/567.2 |
| 7,083,065 B2 | 8/2006 | Zdroik | |
| 7,128,346 B2 * | 10/2006 | Miyajima et al. | 285/204 |
| 7,341,047 B2 * | 3/2008 | Sone et al. | 123/509 |
| 7,784,637 B2 * | 8/2010 | Osborne | 220/562 |
| 7,896,405 B2 | 3/2011 | Hattori et al. | |
| 2002/0047017 A1 * | 4/2002 | Goto et al. | 220/562 |
| 2002/0079416 A1 | 6/2002 | Choji et al. | |
| 2004/0124567 A1 * | 7/2004 | Stangier | 264/523 |
| 2004/0245253 A1 | 12/2004 | Zdroik | |
| 2004/0256396 A1 * | 12/2004 | Suenaga | 220/565 |
| 2005/0194711 A1 | 9/2005 | Choji et al. | |
| 2008/0135562 A1 * | 6/2008 | Miyajima | 220/562 |
| 2008/0138554 A1 * | 6/2008 | Maeda et al. | 428/36.9 |
| 2008/0149642 A1 * | 6/2008 | Borchert et al. | 220/562 |
| 2008/0210692 A1 * | 9/2008 | Fujita | 220/562 |
| 2009/0058015 A1 * | 3/2009 | Laule et al. | 277/591 |
| 2009/0206097 A1 | 8/2009 | Gebert et al. | |
| 2011/0174946 A1 * | 7/2011 | Araya et al. | 248/225.21 |
| 2011/0215093 A1 | 9/2011 | Brück et al. | |
| 2013/0193150 A1 * | 8/2013 | Keefer et al. | 220/562 |
| 2014/0217094 A1 * | 8/2014 | Wolf | 220/86.2 |

FOREIGN PATENT DOCUMENTS

| | | |
|---|---|---|
| DE | 102008028277 A1 | 12/2009 |
| EP | 838360 A1 | 4/1998 |
| EP | 1291222 A1 | 3/2003 |
| JP | S63129624 U | 8/1988 |
| JP | 01124554 | 5/1989 |
| JP | 2010150980 | 7/2010 |
| WO | 9902825 A1 | 1/1999 |

OTHER PUBLICATIONS

English translation of Korean Office Action/Notice of Grounds for Rejection mailed Mar. 27, 2014, received in related Korean Application No. 2013-7002607, 3 pgs.

PCT International Search Report and Written Opinion mailed Mar. 16, 2012, received in corresponding PCT Application No. PCT/EP2011/003340, 14 pgs.

English translation of Chinese Office Action/Search Report issued Dec. 26, 2014, received in related Chinese Patent Application No. 201180036760.2, 8 pgs.

* cited by examiner

THERMOPLASTIC TANK

The invention relates to a thermoplastic tank. The invention relates in particular to an auxiliary fluid tank for a motor vehicle. Auxiliary fluid tanks are understood as meaning, for example wipe/wash tanks, hydraulic fluid tanks, brake fluid tanks or reducing agent tanks for accommodating a reducing agent for the selective catalytic reduction of exhaust gases of a motor vehicle.

In principle, a tank according to the present invention may also be designed as a fuel tank for a motor vehicle. Tanks of the above-mentioned type are generally extrusion blow-moulded from thermoplastic and consist of a thermoplastic which is based at least predominantly on high density polyethylene (HDPE).

A wide variety of boundary conditions predetermined by the installation situation of the tank in the motor vehicle have to be observed in the designing of tanks of this type. Firstly, the tank is intended to have a maximum filling volume and, secondly, the external contour is intended to be designed as far as possible such that construction space is optimally utilized in the installation situation. Furthermore, connections on the tank are intended to be arranged so as to be maximally protected. Connections in this context include, for example, nipples, maintenance and filling openings and other ducts on the tank.

It is in principle known to provide openings in the tank wall, through which insert parts are placed into the tank such that said insert parts themselves close the tank in a sealing manner in the region of the opening. The parts are frequently welded to the tank wall, specifically in the region of a welding flange provided for this purpose on the outside of the tank wall. The provision of welding flanges of this type on the tank is basically not compatible with the requirement for optimization of construction space and optimum use of the tank volume.

Therefore, the invention is based on the object of providing a thermoplastic tank which is provided with at least one tank opening in such a manner that the requirement for optimum utilization of construction space and optimum utilization of the volume is very substantially taken into account.

The invention is furthermore based on the object of providing a method for producing a tank of this type.

The object is achieved first of all by a thermoplastic tank with at least one insert part which is provided in the interior of the tank and is inserted into the tank through an opening in a tank wall and is sealed against a peripheral flange provided in the region of the opening, wherein the flange is formed integrally with the tank wall and the flange is formed on the outside of the tank so as to be able to be at least partially engaged under and/or engaged around.

The tank according to the invention has the advantage that the joining surface of the flange does not protrude or at least does not protrude substantially over the outer wall of the tank, and therefore the tank has a substantially closed envelope, as a result of which optimum utilization of construction space in the installation situation is ensured. Within the context of the invention, "parts of the outer wall of the tank" are to be understood as meaning parts of the tank casing surface, and therefore the joining surface of the flange is joined into the outer contour of the tank.

An expedient refinement of the tank according to the invention is distinguished in that the edge of the flange is provided with one or more outwardly protruding projections in the form of webs, retaining cams or the like. A clamping tool which absorbs the forces applied to the joining surface of the flange during the joining operation/welding connect on such projections, webs or retaining cams.

Alternatively, it can be provided that the flange is reinforced by means of a metal claw ring which has at least one and preferably more than one outwardly protruding retaining claw. Retaining claws of this type can be engaged around or behind by a clamping tool.

The joining surface of the flange is expediently designed to be aligned at least with parts of the outer wall of the tank.

The flange is expediently provided with undercuts at least over parts of the circumference thereof, which undercuts can be engaged behind, for example, by a retaining device. Such a retaining device may be, for example, a collet chuck, such as is used for producing a welding connection as an abutment for the joining pressure which is to be applied.

In a particularly advantageous refinement of the tank according to the invention, it is provided that the undercut is formed by at least one depression in the tank wall at the expense of the tank volume. The concept according to the invention can be summarized to the effect that the flange according to the invention is countersunk or sunk into the casing surface of the tank and nevertheless can be engaged behind or engaged under. This ensures that, upon production of a welding connection to an add-on part or insert part, the flange can be engaged behind by a counterbearing or an abutment without the welding surface having to be supported for this purpose from the inside of the tank. In this way, the counterforce or equalizing force to be applied during the welding operation can be absorbed by a supporting element, and therefore the tank wall is substantially kept free from the joining forces during welding.

In a particularly preferred alternative of the tank according to the invention, it is provided that the flange has a plurality of undercuts which are arranged at a distance from one another and are formed by a plurality of depressions, which are provided at a distance from one another, in the outer wall of the tank.

It is particularly advantageous if the depressions are interrupted by elevations which extend radially with respect to the opening and, in the interior of the tank, each form inflow channels in the direction of the opening. This geometry has the advantage that, for example in the case of a fuel tank, a surge tank can be inserted into the opening in such a manner that the surge tank base which forms the closure of the opening forms the tank bottom and the fluid can pass to the bottom suction point which is defined by the surge tank base. This is also advantageous in an alternative of the tank in the form of a reducing agent tank in which, for example, a heating module is inserted into the tank, via which the reducing agent at the base of the tank is sucked up. Also in this case, the end of the heating element which is at the bottom in the installation position and which closes the opening forms the bottom of the tank, and therefore the fluid can pass to the bottom suction point.

The radially extending elevations provided in the outer wall of the tank form inflow channels on the inside of the tank into the region of the opening.

In a preferred alternative of the tank according to the invention, it is provided that said tank has been produced by extrusion blow-moulding. Said tank can have been produced, for example, by extrusion blow-moulding from polyethylene or from a material on the basis of polyethylene. Said tank can be of single- or multi-layered design. In the event of the design as a multi-layered tank, the latter can be formed, for example, as a co-extrudate with barrier layers for oxygen and/or hydrocarbons. The insert part may be provided, for example, with a pedestal or lid which is composed of a material which is compatible with the flange in terms of weldability.

The insert part is preferably inserted into the tank in a manner closing the opening and is welded to the flange. As an alternative, a cohesive material joint by means of an adhesion promoter, for example a hot melt adhesive, is possible.

The tank according to the invention is preferably designed as a reducing agent tank for a motor vehicle with catalytic exhaust gas reduction, wherein the tank comprises at least one functional module, in particular a heating module, as the insert part.

The object on which the invention is based is furthermore achieved by a method for producing a thermoplastic tank with at least one insert part which can be inserted into an opening in the tank in a manner tightly closing the tank, the method comprising integrally producing the tank with an opening, wherein the opening is produced during the formation of the tank with a peripheral flange which is countersunk from the outside in the container wall and can be engaged behind, engaging behind the flange by means of a retaining device, heating the flange by means of a heating device, inserting an insert part together with a lid closure into the opening and joining the likewise previously heated lid closure to the flange under pressure for the purpose of welding the joining surfaces of the flange and of the lid closure together by being supported against the retaining device, and subsequently removing the retaining device.

With the method according to the invention, a collet chuck is placed against the flange as a retaining element when welding the insert part against the flange such that the retaining elements of said collet chuck engage behind the flange. Said retaining elements may advantageously enter the depressions in the outer wall of the tank in the process.

Figure 2:
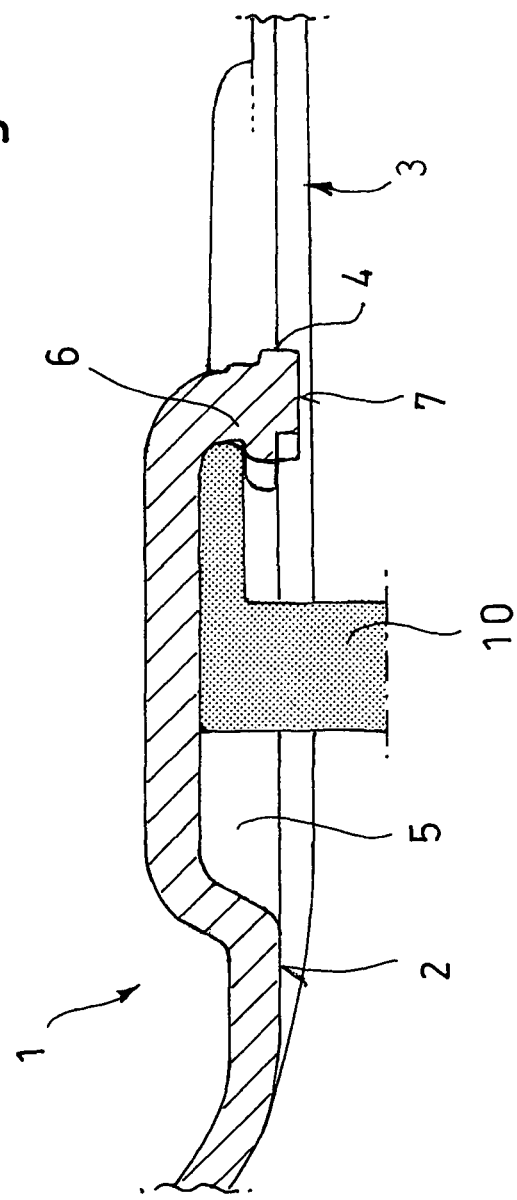
Figure 3:
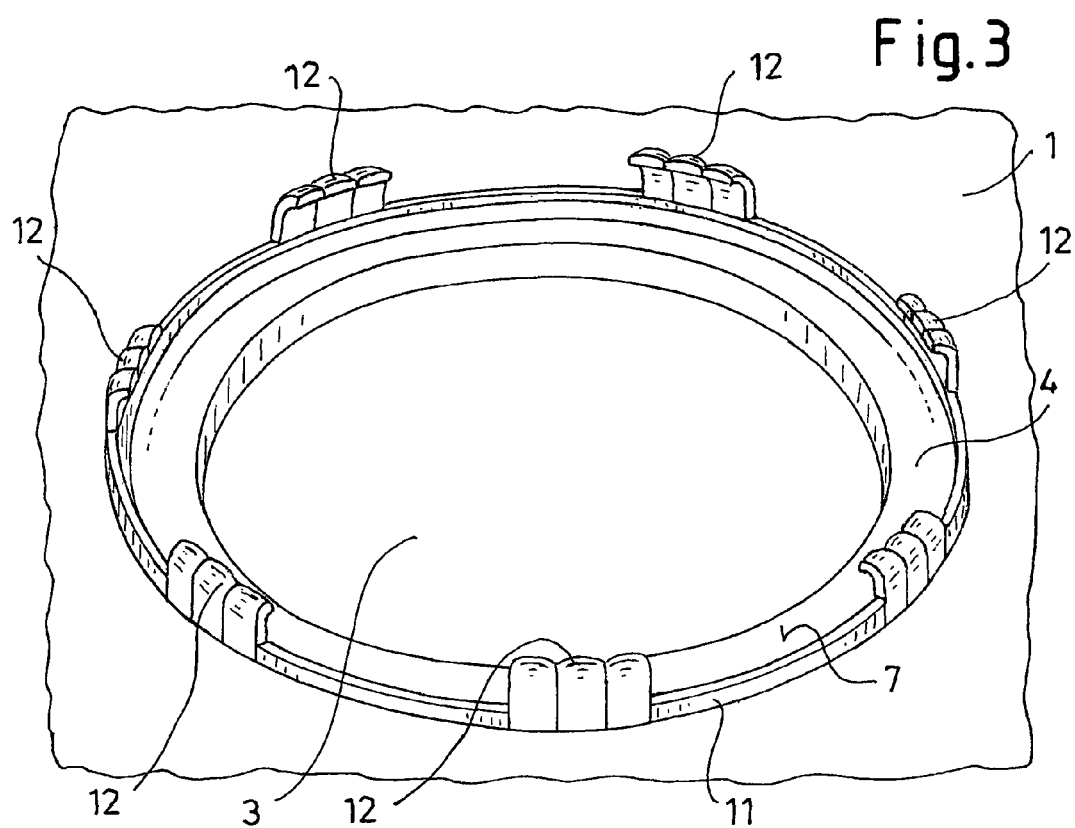
Figure 4:
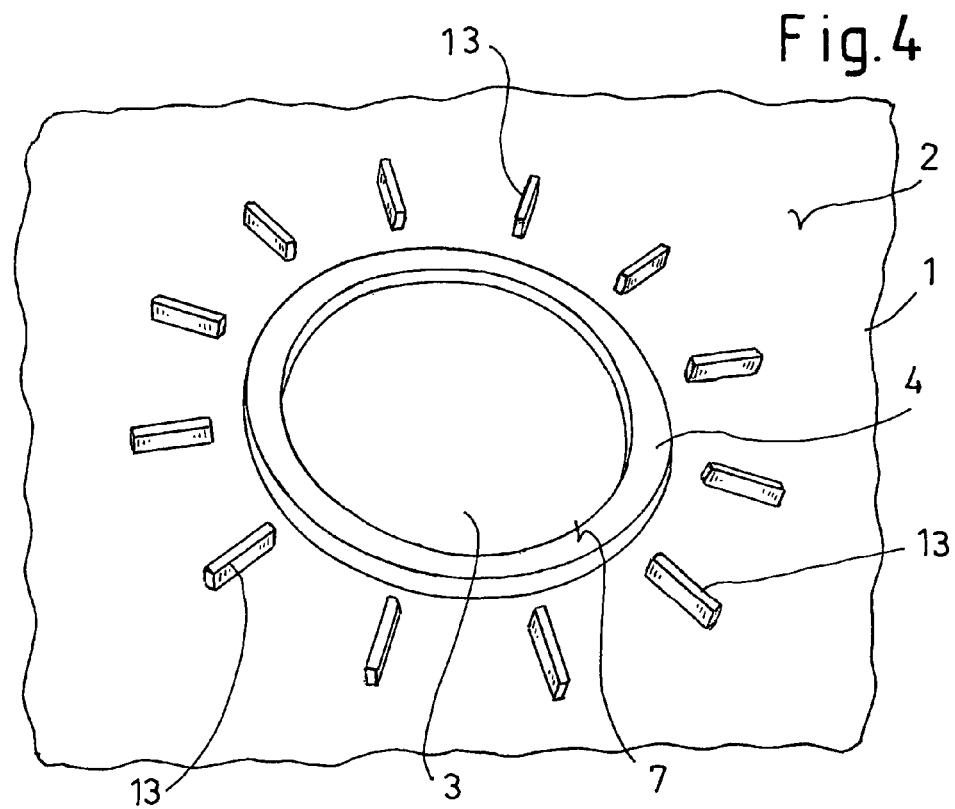
Figure 5:
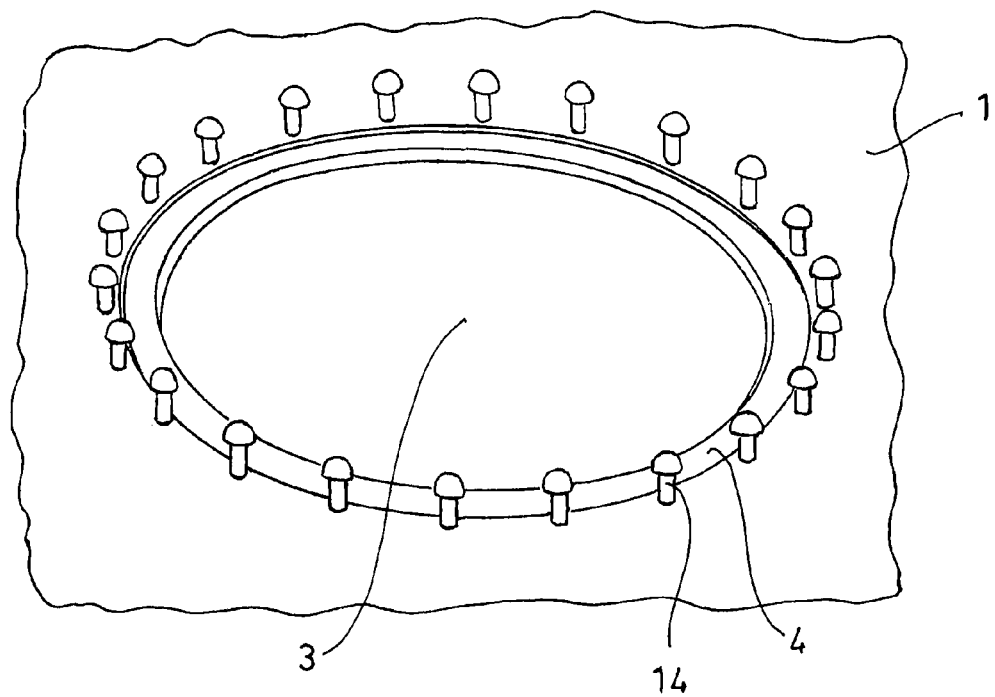
Figure 6:
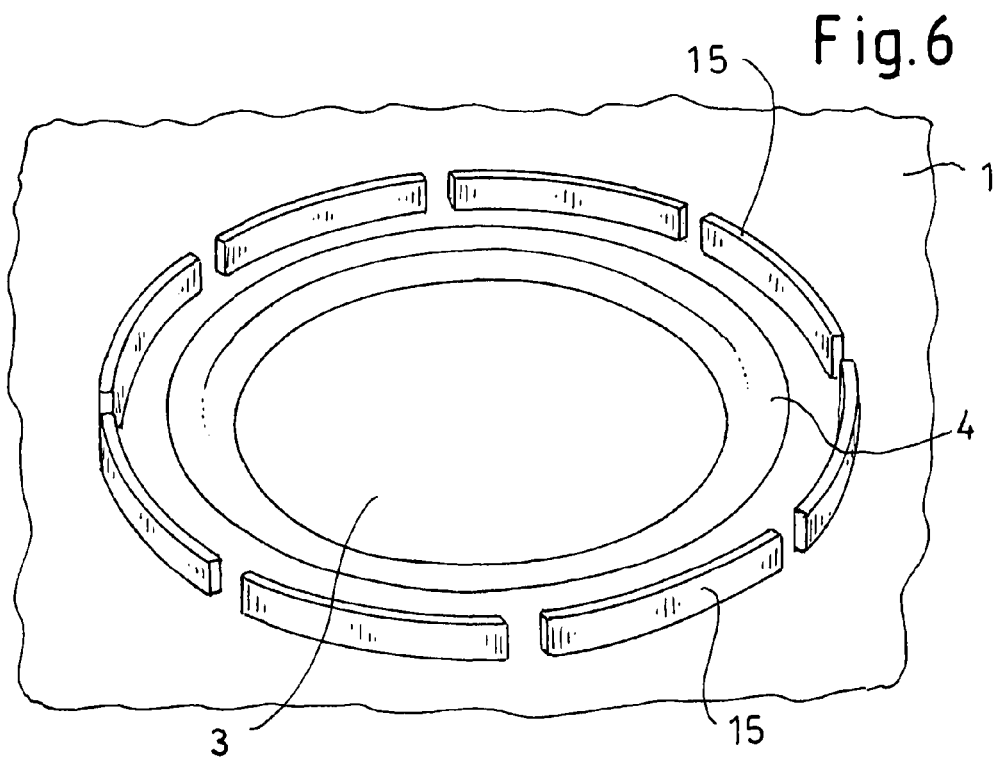

The invention is explained below with reference to an exemplary embodiment which is illustrated in the drawings, in which:

FIG. 1 shows a perspective view of the tank according to the invention in the region of an opening, wherein the view shows the outside and lower side of the tank, FIG. 2 shows a section along the line I-I in FIG. 1, FIG. 3 shows a perspective view of part of the tank according to the invention in accordance with a further exemplary embodiment, FIG. 4 shows a third exemplary embodiment of the tank according to the invention, FIG. 5 shows a fourth exemplary embodiment of the tank according to the invention, and FIG. 6 shows a fifth exemplary embodiment of the tank according to the invention.

The tank 1 is illustrated perspectively in FIG. 1, wherein the figure shows the outside and lower side of the tank wall 2. The tank wall 2 is provided with a circular opening 3 through which an insert part (not illustrated) can be inserted into the tank 1, specifically in a manner closing the opening 3.

The tank 1 is provided as a reducing agent tank for a motor vehicle with selective catalytic exhaust gas reduction. However, said tank may also be provided as a fluid tank for other operating fluids of a motor vehicle. The tank 1 substantially consists of a thermoplastic on the basis of high density polyethylene (HDPE). Said tank has been produced as a single piece from thermoplastic by extrusion blow-moulding.

The insert part to be inserted into the opening 3 comprises a base and/or lid closure which is welded to the tank wall 2 via the circumference of the opening 3.

The edge of the opening 3 is surrounded by a flange 4 which serves for the welding to the insert part or to a base/lid of the insert part. The flange 4 has been formed integrally with the tank 1 during the formation of the latter, specifically is sunk into the tank wall 2, as will be described below. That is to say, the flange 4 has been formed at the expense of the tank volume.

As can be gathered in particular from FIG. 1, hollows 5 which are arranged at a distance from one another and at equal spacing from one another define the circumference of the flange 4 are provided in the tank wall 2/tank outer wall 4. The hollows 5 are designed in such a manner that they form circular-segment-like undercuts 6 of the flange 4.

The flange 4 has a joining surface 7 which is furthermore aligned with the surface 8 of the tank wall 2 outside the hollows 5. In the exemplary embodiment illustrated, the opening 3 has a circular cross section, and the flange 4 surrounding said opening is accordingly of circular-ring-shaped design and the hollows 5 are designed as segments of a circular ring which is interrupted by four material bridges 9. Of course, the opening 3 does not have to be circular but may have an arbitrarily configured contour line and the contour of the flange is changed correspondingly. Accordingly, the hollows 5 can also be configured differently.

The material bridges 9 represent piercings of the flange 4; in this example, there is an undisturbed connection of the surface 8 of the tank wall 2 as far as the boundary line, which is defined by the opening 3, of the tank wall 2. As viewed from the inside of the tank 1, the material bridges 9 form channels which form an inflow of fluid provided in the tank 1 to a closure/lid closure which covers the opening 3 and which therefore defines the bottom of the tank, and therefore, for example, fluid can reach the bottom suction point in the tank 1, which suction point is provided in the region of the opening 3. This is advantageous, for example, if a pump or a heating element is inserted into the tank 1 through the opening 3.

The opening is preferably closed by heating element welding, wherein the energy required for the welding operation is introduced into the flange 4 by a heating element (contact heat transfer). This takes place, for example, by means of a welding mirror pressed onto the flange. The joining surface 7 of the flange is softened by means of the welding mirror (not illustrated). At the same time, the component to be joined is likewise softened by the same welding mirror or by a further welding mirror on the corresponding contact surface/joining surface. The component is then pressed onto the joining surface 7 with a certain press-on force, and the press-on force is subsequently reduced so that the softened material is not pushed out of the region of the joining surface 7.

In order to be able to apply the required counterforce, the undercuts 6 of the flange 4 are engaged behind by means of retaining elements 10 which are part of a collet chuck (not illustrated). After the welding operation is ended, the retaining elements 10 can be removed.

In the exemplary embodiment illustrated in FIG. 3, the flange 4 of the tank 1 is provided with a claw ring 11 which surrounds the opening 3 and has outwardly protruding retaining claws 12 which can be engaged behind and which, distributed at a distance over the circumference of the claw ring 11, protrude outwards. The claw ring 11 has been blown into the tank 1 in the region of the opening 3 during the production of said tank.

In the alternative of the tank 1 that is illustrated in FIG. 4, material webs 13 which are distributed uniformly over the circumference of the flange 4 and extend approximately radially are integrally formed on the outer tank wall 2.

In the exemplary embodiment of the tank 1 according to FIG. 5, retaining cams 14 of mushroom-shaped design are provided instead of the material webs 13.

In the exemplary embodiment according to FIG. 6, material webs 15 are likewise integrally formed on the tank wall 2 on the circumference of the opening 3 in the tank 1, said material webs, like the retaining cams 14 and the material webs 13 or the retaining claws 12, permitting engagement of a clamping tool.

LIST OF REFERENCE NUMBERS

1 Tank
2 Tank wall
3 Opening
4 Flange
5 Hollows
6 Undercuts
7 Joining surface
8 Surface
9 Material bridges
10 Retaining element
11 Claw ring
12 Retaining claws
13 Material webs
14 Retaining cams
15 Material webs

What is claimed is:

1. Thermoplastic tank with at least one insert part which is provided in the interior of the tank and is inserted into the tank through an opening in a tank wall and is sealed against a peripheral flange provided in the region of the opening, wherein the flange is formed integrally with the tank wall and the flange is formed on the outside of the tank so as to be able to be at least partially engaged under and/or engaged around characterized in that the flange is provided with a plurality of undercuts at least over parts of the circumference thereof, said undercuts arranged at a distance from one another and formed by a plurality of hollows which are provided at a distance from one another in the outer wall of the tank, said hollows being interrupted on the outside of the tank by material bridges which extend radially with respect to the opening and, in the interior of the tank, each form inflow channels in the direction of the opening.

2. Tank according to claim 1, characterized in that the edge of the flange is provided with one or more outwardly protruding projections in the form of webs or retaining cams.

3. Tank according to claim 1, characterized in that the flange is reinforced by means of a metal claw ring which has one or more outwardly protruding retaining claws.

4. Tank according to claim 1, characterized in that the joining surface of the flange is designed to be aligned at least with parts of the outer wall of the tank.

5. Tank according to claim 1, characterized in that the undercuts are formed by at least one hollow in the tank wall at the expense of the tank volume.

6. Tank according to claim 1, characterized in that said tank has been produced by extrusion blow-moulding.

7. Tank according to claim 1, characterized in that the insert part is inserted into the tank in a manner closing the opening and is welded to the flange.

8. Tank according to claim 1 as a reducing agent tank for a motor vehicle with catalytic exhaust gas reduction, wherein the tank comprises at least one functional module as the insert part.

9. Method for producing a thermoplastic tank with at least one insert part which can be inserted into an opening in the tank in a manner tightly closing the tank, the method comprising integrally producing the tank with at least one opening, wherein the opening is produced during the formation of the tank with a peripheral flange which is countersunk from the outside in the tank wall and can be engaged behind, engaging behind the flange by means of a retaining device, heating the flange by means of a heating device, inserting an insert part together with a lid closure into the opening and joining the likewise previously heated lid closure to the flange under pressure for the purpose of welding the joining surfaces of the flange and of the lid closure together by being supported against the retaining device, and subsequently removing the retaining device; and characterized in that the flange is provided with a plurality of undercuts at least over parts of the circumference thereof, said undercuts arranged at a distance from one another and formed by a plurality of hollows which are provided at a distance from one another in the outer wall of the tank, said hollows being interrupted on the outside of the tank by material bridges which extend radially with respect to the opening and, in the interior of the tank, each form inflow channels in the direction of the opening.

* * * * *